US008904446B2

(12) United States Patent
Pandey

(10) Patent No.: US 8,904,446 B2
(45) Date of Patent: Dec. 2, 2014

(54) METHOD AND APPARATUS FOR INDEXING CONTENT WITHIN A MEDIA STREAM

(75) Inventor: Chandra Pandey, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 59 days.

(21) Appl. No.: 13/483,594

(22) Filed: May 30, 2012

(65) Prior Publication Data

US 2013/0326561 A1 Dec. 5, 2013

(51) Int. Cl.
*H04N 5/76* (2006.01)
*H04N 21/433* (2011.01)
*H04N 5/921* (2006.01)
*H04N 5/445* (2011.01)
*H04N 21/472* (2011.01)
*H04N 21/482* (2011.01)

(52) U.S. Cl.
CPC ........... *H04N 21/4334* (2013.01); *H04N 5/921* (2013.01); *H04N 5/44543* (2013.01); *H04N 21/47214* (2013.01); *H04N 21/482* (2013.01)
USPC ................ 725/58; 725/61; 386/295; 386/356

(58) Field of Classification Search
CPC ..................... H04N 21/4334; H04N 21/47214; H04N 21/482; H04N 5/76; H04N 5/921; H04N 5/44543
USPC ...................................... 725/58; 386/295, 356
See application file for complete search history.

(56) References Cited

U.S. PATENT DOCUMENTS

| | | | | |
|---|---|---|---|---|
| 5,610,774 A * | 3/1997 | Hayashi et al. | | 360/15 |
| 6,112,186 A * | 8/2000 | Bergh et al. | | 705/7.32 |
| 7,088,910 B2 * | 8/2006 | Potrebic et al. | | 386/291 |
| 7,430,360 B2 * | 9/2008 | Abecassis | | 386/343 |
| 7,496,845 B2 * | 2/2009 | Deutscher et al. | | 715/726 |
| 8,699,861 B2 * | 4/2014 | Potrebic et al. | | 386/294 |
| 8,769,601 B2 * | 7/2014 | Cooper et al. | | 725/142 |
| 2003/0093806 A1 * | 5/2003 | Dureau et al. | | 725/107 |
| 2005/0289637 A1 * | 12/2005 | Burke et al. | | 725/138 |
| 2007/0055986 A1 * | 3/2007 | Gilley et al. | | 725/34 |
| 2007/0124756 A1 * | 5/2007 | Covell et al. | | 725/18 |
| 2007/0180466 A1 * | 8/2007 | Ando et al. | | 725/37 |
| 2008/0092168 A1 * | 4/2008 | Logan et al. | | 725/44 |
| 2008/0155627 A1 * | 6/2008 | O'Connor et al. | | 725/109 |
| 2008/0184297 A1 * | 7/2008 | Ellis et al. | | 725/39 |
| 2008/0235587 A1 * | 9/2008 | Heie et al. | | 715/719 |
| 2008/0235733 A1 * | 9/2008 | Heie et al. | | 725/46 |
| 2008/0247541 A1 * | 10/2008 | Cholas et al. | | 380/200 |
| 2009/0304350 A1 * | 12/2009 | Beyabani et al. | | 386/95 |
| 2010/0122293 A1 * | 5/2010 | Craner | | 725/40 |
| 2010/0131385 A1 * | 5/2010 | Harrang et al. | | 705/26 |
| 2010/0247065 A1 * | 9/2010 | Cooper et al. | | 386/68 |
| 2011/0307917 A1 * | 12/2011 | Shuster | | 725/23 |
| 2011/0307918 A1 * | 12/2011 | Shuster | | 725/23 |
| 2011/0307931 A1 * | 12/2011 | Shuster | | 725/105 |
| 2012/0023534 A1 * | 1/2012 | Dasilva et al. | | 725/109 |
| 2012/0079548 A1 * | 3/2012 | Whitten | | 725/115 |
| 2013/0007805 A1 * | 1/2013 | Athias | | 725/40 |
| 2013/0125167 A1 * | 5/2013 | Sharif-Ahmadi et al. | | 725/37 |

\* cited by examiner

*Primary Examiner* — Nasser Goodarzi
*Assistant Examiner* — Michael B Pierorazio

(57) ABSTRACT

An approach provides indexing of media content capable of effectively controlling playback availability of the vast variety of media content. A recording of a video session associated with a media stream is initiated. A portion of the video session is selected. And an index for playback of the selected portion and for playback of the video session is configured, wherein the selected portion is played back when the video session is unavailable for playback.

20 Claims, 8 Drawing Sheets

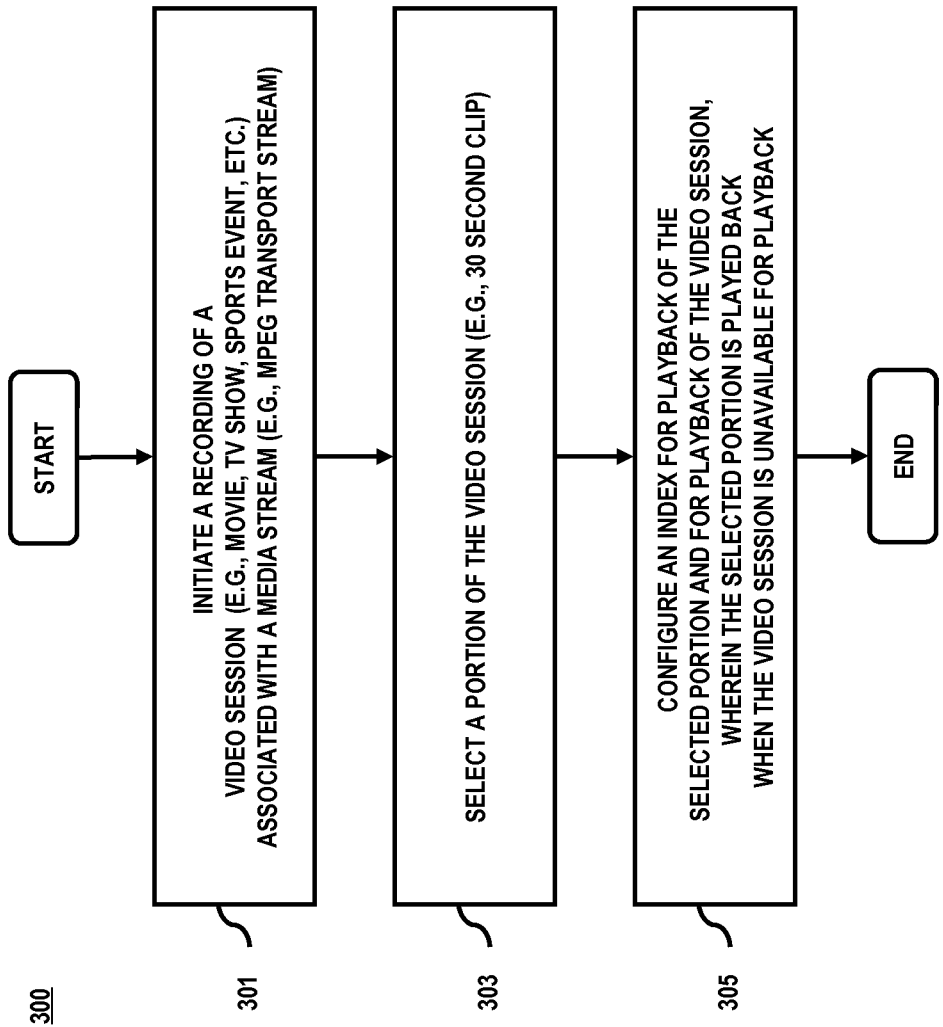

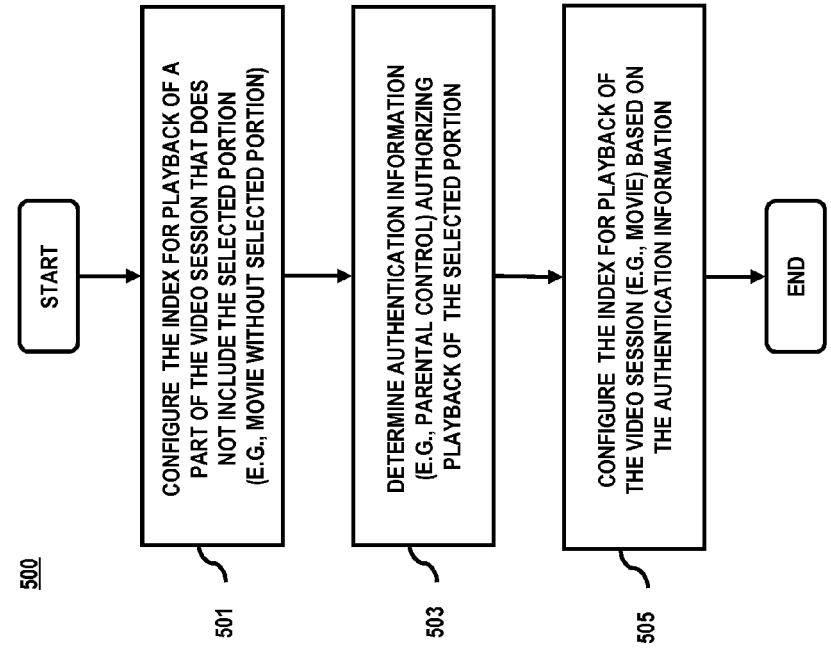

FIG. 5

500
- 501: CONFIGURE THE INDEX FOR PLAYBACK OF A PART OF THE VIDEO SESSION THAT DOES NOT INCLUDE THE SELECTED PORTION (E.G., MOVIE WITHOUT SELECTED PORTION)
- 503: DETERMINE AUTHENTICATION INFORMATION (E.G., PARENTAL CONTROL) AUTHORIZING PLAYBACK OF THE SELECTED PORTION
- 505: CONFIGURE THE INDEX FOR PLAYBACK OF THE VIDEO SESSION (E.G., MOVIE) BASED ON THE AUTHENTICATION INFORMATION

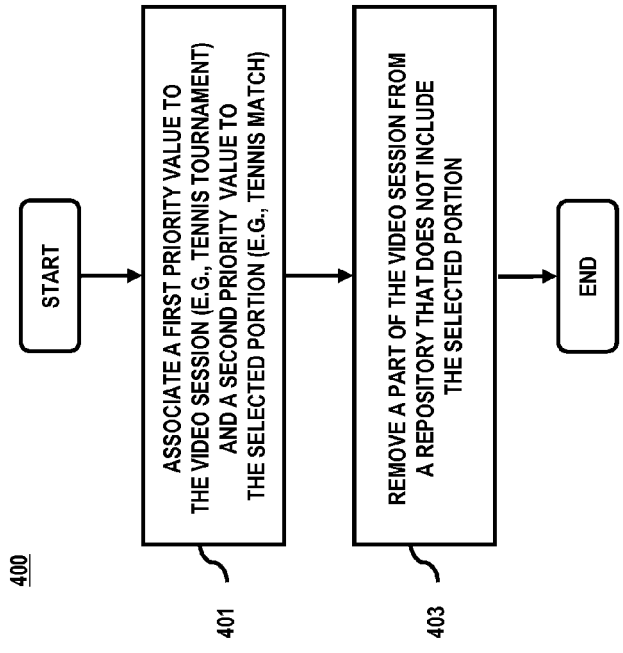

FIG. 4

400
- 401: ASSOCIATE A FIRST PRIORITY VALUE TO THE VIDEO SESSION (E.G., TENNIS TOURNAMENT) AND A SECOND PRIORITY VALUE TO THE SELECTED PORTION (E.G., TENNIS MATCH)
- 403: REMOVE A PART OF THE VIDEO SESSION FROM A REPOSITORY THAT DOES NOT INCLUDE THE SELECTED PORTION

METHOD AND APPARATUS FOR INDEXING CONTENT WITHIN A MEDIA STREAM

BACKGROUND INFORMATION

With the convergence of telecommunications and media services, there is increased competition among service providers to offer more services and features to consumers, and concomitantly develop new revenue sources. For instance, traditional telecommunication companies are entering the arena of media services that have been within the exclusive domain of cable (or satellite) television service providers. Thus, customers can readily access a vast supply and variety of audio/video content. For example, live audio/video content can be received via a broadcast network, a cable network, Verizon® FiOS® network, satellite network, an internet protocol television (IPTV) system, an internet protocol video system, a wireless network, etc. Concurrently, media services have enjoyed great success in other industries, such as portable media devices (e.g., personal digital assistants (PDAs), MP3 players, mobile phones, etc.), audio streaming services, video streaming, etc. With the vast variety of media content delivery mechanisms, traditional techniques for indexing media content have become inadequate.

Therefore, there is a need for an approach to provide effective indexing of media content.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 3 is a flowchart of a process for providing an index of media content for controlling playback availability of media content, according to one embodiment;

FIG. 4 is a flowchart of a process utilizing an index of media content for removing media content from a repository, according to one embodiment;

FIG. 5 is a flowchart of a process utilizing an index of media content for controlling playback of selected portions, according to one embodiment;

DESCRIPTION OF THE PREFERRED EMBODIMENT

A preferred apparatus, method, and system for providing an index of media content for controlling playback availability of media content is described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE). Furthermore, although the STB is explained in the context of playback of visual media (e.g., TV shows, movies, news, sporting events, etc.), it is contemplated that other media relating to various sources and types (e.g., audio books, cached web pages, web cast, etc.) are applicable.

Figure 1:
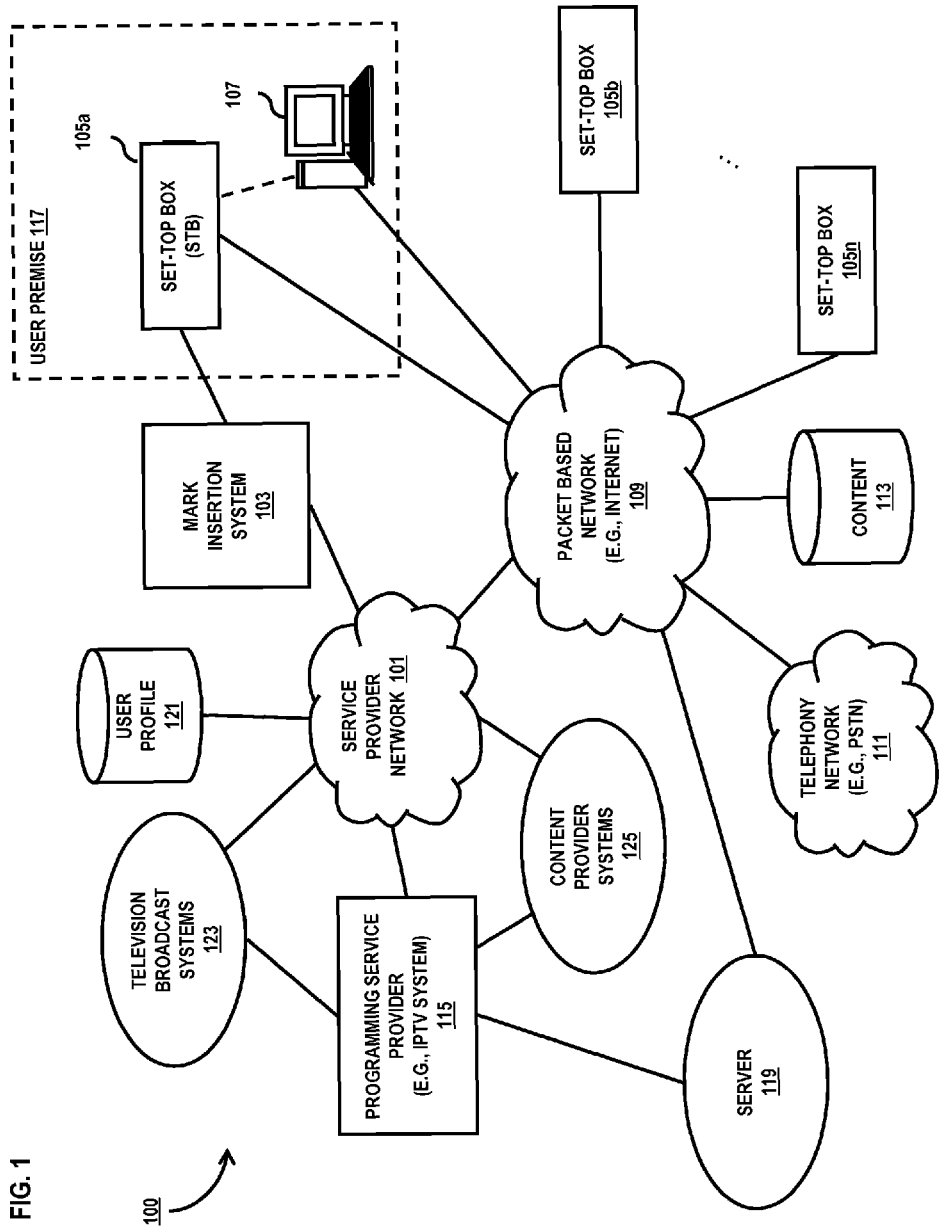
FIG. 1 is a diagram of a system capable of providing an index of media content for controlling playback availability of media content, according to one embodiment.

FIG. 1 is a diagram of a system capable of providing an index of media content for controlling playback availability of media content, according to one embodiment. For the purposes of illustration, a system 100 is described with respect to processing of media streams that include video and/or audio content. The system 100 includes a service provider network 101 that integrates television medium with that of the telecommunications, computing, and media environments, thereby broadening the scope of devices and sources available to individuals for obtaining programming content or other media. By way of example, the service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form. A mark insertion system 103 provides the insertion of marks (e.g., indices) indicating a portion or part of a media (e.g., video session) of media streams. In certain embodiments, these media streams include video streams encoded according to Motion Pictures Expert Group (MPEG) standards—e.g., MPEG-2. This process and associated systems are more fully described with respect to FIG. 3.

Traditionally, indexing of media is partitioned by an electronic program guides (EPG, also known as an interactive program guide). The EPG indicates sessions (e.g., TV shows, sporting events, radio shows, etc.) of one or more media streams (e.g., originating from radio station, TV channel, network distributer, etc.). Such sessions are frequently in hourly or semi-hourly blocks of time. A set-top box (STB) may then record a session using information derived from the EPG, for instance, a start and end time (e.g., an hour block starting at 8 P.M.) of the video session and a media stream (e.g., TV channel) associated with the session. However, traditional indexing requires parts and/or portions of the session to be retained and played back together. For example, an entire sporting event (e.g., a tournament) containing a desired portion (e.g., a match of the tournament) traditionally must be retained in a repository in order to playback the desired portion. Additionally, traditional indexing only allows a restriction to be placed on an entire session rather than a part and/or portion of the session. For example, a parental restriction using traditional means prevents a playback of the entire movie rather than only portions containing mature content. However, the approach utilized by mark insertion system 103 allows an indexing of media content for controlling playback availability of parts and/or portions of a session.

In certain embodiments, the user device may be a set-top box, any type of computer device or mobile device having the capability to support voice communications via software, firmware, and/or hardware. Computer devices may include desktop computers, notebook computers, servers, terminal workstations, gaming systems, customized hardware, or other equivalent apparatus. Mobile devices may include wireless telephones, cellular telephones, satellite telephones, personal digital assistants (PDA), pocket personal computers, smart phones, tablets, handsets, portable gaming systems, and customized hardware, as well as other mobile technologies capable transmitting data.

In the example of FIG. 1, service provider network 101 integrates the television medium with that of the telecommunications, computing, and media environments, thereby broadening the scope of devices and sources available to individuals for obtaining programming content or other media. By way of example, service provider network 101 provides programming content that may include any audio-visual content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, songs, audio books, etc.), Internet-based content (e.g., streamed video, streamed audio), and/or any other equivalent media form.

STBs 105a-105n and/or terminal 107 can communicate using the packet-based network 109 and/or the telephony network 111. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, wireless fidelity (Wi-Fi) networks, other wireless networks (e.g., 3G wireless broadband networks, mobile television networks, radio networks, etc.), terrestrial broadcasting networks, provider specific networks (e.g., a Verizon® FiOS® network, a TiVo® network, etc.), and the like. Such networks may also utilize any suitable protocol supportive of data communications, e.g., transmission control protocol (TCP), internet protocol (IP), file transfer protocol (FTP), telnet, hypertext transfer protocol (HTTP), asynchronous transfer mode (ATM), socket connections, Ethernet, frame relay, and the like, to connect STBs 105a-105n to various sources of media content. Although depicted in FIG. 1 as separate networks, packet-based network 109 and/or telephony network 111 may be completely or partially contained within service provider network 101. For example, service provider network 101 may include facilities to provide for transport of packet-based and/or telephony communications.

As discussed previously, media or programming content broadly includes any audio-visual content (e.g., broadcast television programs, VOD programs, pay-per-view programs, IPTV feeds, DVD related content, etc.), pre-recorded media content, data communication services content (e.g., commercials, advertisements, videos, movies, songs, images, sounds, etc.), Internet services content (streamed audio, video, or pictographic media), and/or any other equivalent media form. In this manner, the programming service provider 115 may provide (in addition to the provider's own programming content) content obtained from other sources, such as one or more television broadcast systems 123, one or more third-party content provider systems 125, content residing in the repository 113 or accessible via server 119, as well as available via one or more packet-based networks 109 or telephony networks 111, etc.

For example, server 119 can be an "online" system capable of communicating with one or more third-party web servers (not illustrated), content repositories (e.g., repository 113), or equivalent facilities, to provide users various avenues to locate, specify, receive, and/or share programming content that is accessible over a data network (e.g., packet-based network 109). For example, exemplary embodiments of media slideshow application may comprise hypertext markup language (HTML) user interfaces or JAVA™ applets stored on server 119 and accessed via world-wide-web pages. These interfaces are particularly useful in extending system 100 functionality to devices having limited resources (e.g., PDAs, handsets, thin-clients, etc.). In alternative embodiments, server 119 is collocated with and/or integrated into programming service provider 115.

In the example of FIG. 1, STBs 105a-105n, as end user devices, are located at one or more user premises (e.g., user premise 117), and geospatially associated with one or more regions. STBs 105a-105n may be configured to communicate with and receive signals and/or data streams from a programming service provider 115 (or other transmission facility). These signals include results of applying search or browse operations on the available programming content (e.g., video assets) and related data (e.g., programming guide data, metadata) retrieved over a data network (e.g., service provider network 101, packet-based network 109, and/or telephony network 111), as well as conventional video broadcast content.

In one embodiment, a user profile repository 121 may be employed to maintain subscribers to the device event-based STB control service. User profile repository 121 along with content repository 113, or server 119 may be accessed via one or more service provider networks 101 and/or packet-based networks 109. In one embodiment, the user profile repository 121 stores user settings, preferences, and configuration information relating to the services of network 101. Further, service provider network 101 may include a system administrator (not shown) for operational and management functions to deploy the virtual channel service using, for instance, an internet protocol television (IPTV) system. In this manner, STBs 105a-105n can utilize any suitable technology to draw, receive, and/or transmit media content from/to a programming service provider 115 or other content source/sink. A more detailed explanation of an exemplary STB is provided with respect to FIGS. 2 and 6.

In an exemplary embodiment, STBs 105a-105n can draw, receive, and/or transmit programming guide information (e.g., EPG) and related content from (or to) multiple sources, thereby alleviating the burden on any single source, e.g., programming service provider 115, to gather, supply, or otherwise meet the content demands of any user or premise. Thus, particular embodiments enable authenticated third-party television broadcast systems 123, third-party content provider systems 125, and servers (e.g., server 119) to transmit programming content accessible over a data network to STBs 105a-105n either apart from, or in conjunction with, programming service provider 115. Such programming content may include content regarding traffic, news, sports, current events, breaking stories, commentary, headlines, advertisements, solicitations, financial advice, stocks, markets, events, schools, governments, blog entries, podcasts, and the like. Moreover, media content may be available from authenticated sources, including grassroots groups or individuals, non-profits, governmental organizations, public/private institutions, etc.

In various embodiments, service provider network 101 may include one or more video and/or audio processing modules (not shown) for acquiring and transmitting programming guide information and related content feeds (including content accessible over a data network) from programming service provider 115, the television broadcast systems 123, the third-party content provider systems 125, or servers 119 over one or more of the networks 101, 109, 111, to particular STBs 105a-105n. Accordingly, service provider network 101 may include facilities to support compression/decompression, coding/decoding, modulation/demodulation, optical/electrical conversion, and analog/digital conversion, as well as any other suitable signal processing and/or transmission operation. Further, service provider network 101 can optionally support end-to-end data encryption in conjunction with programming guide creation and related content streaming services such that only authorized users are able to access personalized programming guides and experience content reference therein.

Moreover, system 100 may include an authentication module (not shown) configured to perform authorization/authentication services and determine whether users or content sources are indeed subscribers to, or providers of, the personalized programming guide service. An authentication schema may require a user name and password, a key access number, a unique machine identifier (e.g., media access control (MAC) address), etc., as well as a combination thereof. Once a subscriber has authenticated a presence on system 100, the user may bypass additional authentication procedures for executing later applications (e.g., programming content streaming instances). Data packets, such as cookies, may be utilized for this purpose. Thus, once an STB or content source is authenticated, connections between the STBs 105a-105n and the content sources may be established directly or through the programming service provider 115.

In particular embodiments, programming service provider 115 may comprise an IPTV system configured to support the transmission of television video programs from the broadcast systems 123 as well as other content, such as content from the various third-party sources (e.g., 113, 119, 123, 125) utilizing internet protocol (IP). That is, the program service provider 115 may deliver programming guide information, signals and/or streams, including programming content accessible over a data network, in the form of IP packets. Further, the transmission network (e.g., service provider network 101) may optionally support end-to-end data encryption in conjunction with the streaming services, as previously mentioned.

In this manner, the use of IP permits television services to be integrated with broadband Internet services, and thus, share common connections to a user site. Also, IP packets can be more readily manipulated, and therefore, provide users with greater flexibility in terms of control and offers superior methods for increasing the availability of programming guide information and related content. Delivery of video content, by way of example, may be through a multicast from the program service provider 115 to the STBs 105a-105n. Any individual STB may tune to a particular content source by simply joining a multicast (or unicast) of the media content, utilizing an IP group membership protocol (IGMP). For instance, the IGMP v2 protocol may be employed for joining STBs to new multicast (or unicast) groups. Such a manner of content delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the programming content may be provided to various IP-enabled devices, such as those computing, telephony, and mobile apparatuses previously delineated.

An STB (e.g., STB 105a) may integrate all the functions of an IPTV system, as well as combine the programming content and video asset management functions of the various online or off-line environments. For example, it is contemplated that the personalized programming guide service may be extended to users with a presence on the Internet. In alternative embodiments, the services of system 100 could be extended to users having an end terminal (not shown), such as a plain old telephone service (POTS) device, connected to the telephony network 111. While system 100 is illustrated in FIG. 1, the exemplary components are not intended to be limiting, and indeed, additional or alternative components and/or implementations may be utilized.

Although the user equipment is described with respect to an STB 105, it is contemplated that various embodiments have applicability to any device capable of processing video, audio, and/or multimedia streams.

Figure 2:
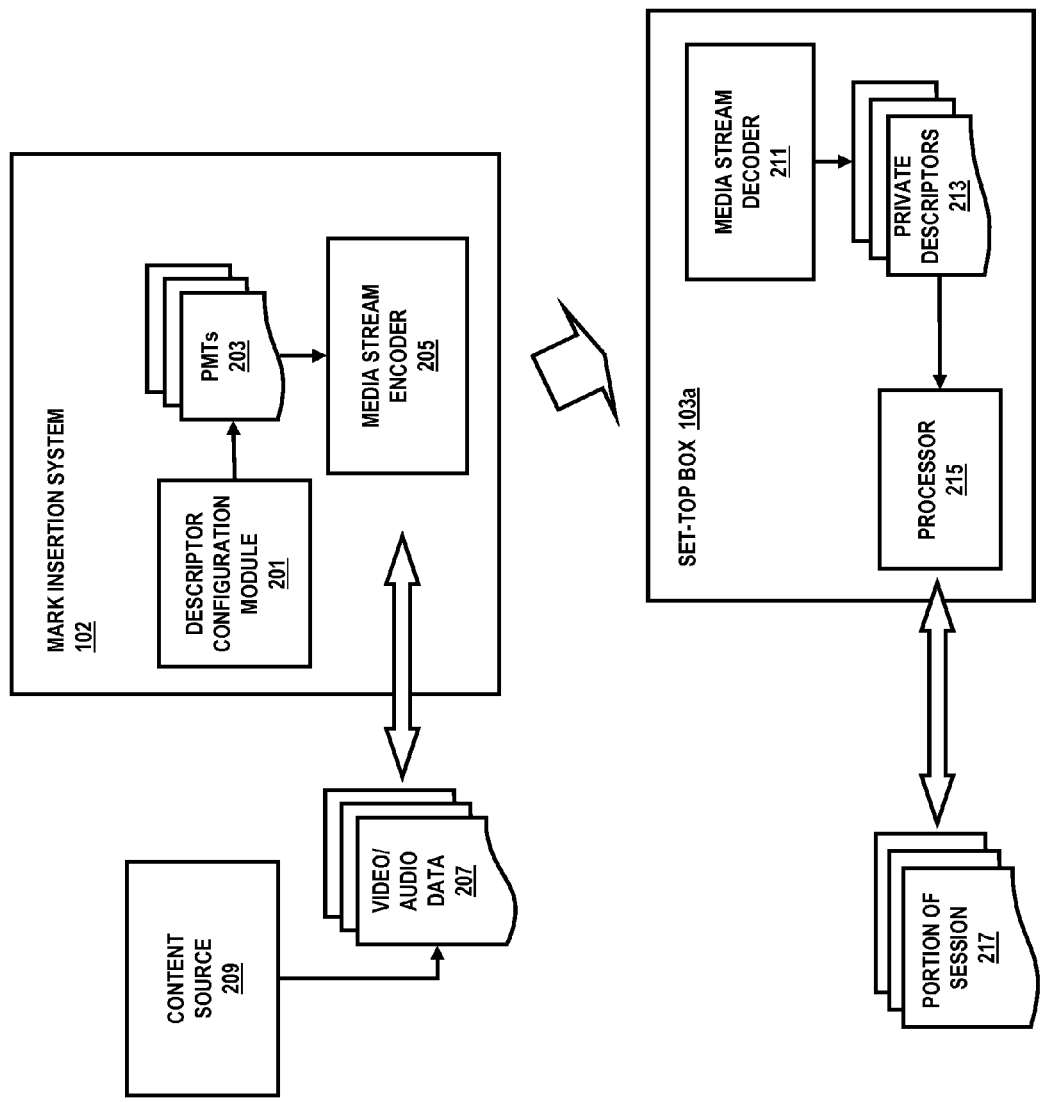
FIG. 2 is a diagram of a mark insertion system for an index of media content, according to one embodiment.

FIG. 2 is a diagram of a mark insertion system for an index of media content, according to one embodiment. For the purposes of explanation, mark insertion system 103 is shown to include a descriptor configuration module 201 that sets the appropriate program parameters (e.g., private descriptors) within Program Map Tables (PMTs) 203 of the corresponding video/audio data 207. These media data can originate from any of the content sources 209 described with respect to system 100 of FIG. 1. The PMTs are included as part of the media streams encoded by media stream encoder 205. As noted, in certain embodiments, encoder 205 can employ an MPEG-2 scheme to generate the media stream for broadcast to one or more set-top boxes, such as set-top box 105a.

An MPEG transport stream (or a program stream) comprises a Program Map Table (PMT), which provides the mappings between program numbers and the program elements that comprise them. A single instance of the mapping is referred to as a program definition, while the PMT refers to the complete collection of all program definitions for a transport stream. The PMT also employs descriptor fields, which are structures for extending the definitions of programs and program elements. For example, descriptors can utilize a format that begins with an 8-bit tag value in addition to an 8-bit descriptor length and 8-bit data fields. The descriptor tag identifies each descriptor; the tag values 64 through 255 are provided as user available descriptor tag values. Further details of some of the descriptors as defined in Table 2-39 of International Organization for Standardization/International Electrotechnical Commission (ISO/IEC) 13818-1—Information Technology—Generic Coding of moving pictures and associated audio information—Part 1—Systems, which is incorporated herein in its entirety.

Private descriptors can be defined using user available private tag values. According to certain embodiments, one or more user available private tag values are utilized to define private descriptors that can be modified to associate one or more programs with one or more applications. These private descriptors may be used to identify portion of a session 217. In one embodiment, a placement of the private descriptor indicates either a start of a portion or an end of a portion. For example, a private descriptor inserted at a 15 second playback time and another private descriptor inserted at a 30 second playback time indicate a portion that starts at the 15 second playback time and ends at the 30 second playback time. Additionally, or alternatively private descriptors may contain information indicating a duration, start point, and/or end point of a portion. For example, a private descriptor inserted (at any time) in a session may itself contain information indicating a final frame number (e.g., 1,000) and a total number of frames (e.g., 100) that may be used to determine a portion (e.g., frames 900 to 1,000).

In this example, set-top box 105a, upon receiving the media stream, decodes, via media stream decoder 211, the media stream generated by mark insertion system 103. As explained in FIG. 3, the one or more private descriptors 213 (or marks) may be used to configure an index for playback of the selected portion and for playback of the video session.

STB 105a may comprise computing hardware (such as described with respect to FIG. 8) and include additional components. In addition, STB 105a includes hardware and/or other components to support related functions and capabilities for viewing video content (e.g., remote control capabilities, conditional access functions, tuning functions, presentation functions, multiple network interfaces, audio/video signal ports, etc.). The functions and operations of STB 105a may be governed by processor 215 (or other controllers (not shown)) that interacts with each of the STB components to provide programming guide information and related content retrieved from an audio or video-sharing site, as well as from another STB device or component of system 100. In turn, the user may be afforded greater functionality utilizing a control device (e.g., remote control) to control the personalized programming guide service and related services.

STB 105a may be configured to communicate with a number of user devices, including: a PC 107, laptops, PDAs, cellular phones, mobile devices, handheld devices, as well as any other equivalent technology capable of capturing and storing media.

Figure 8:
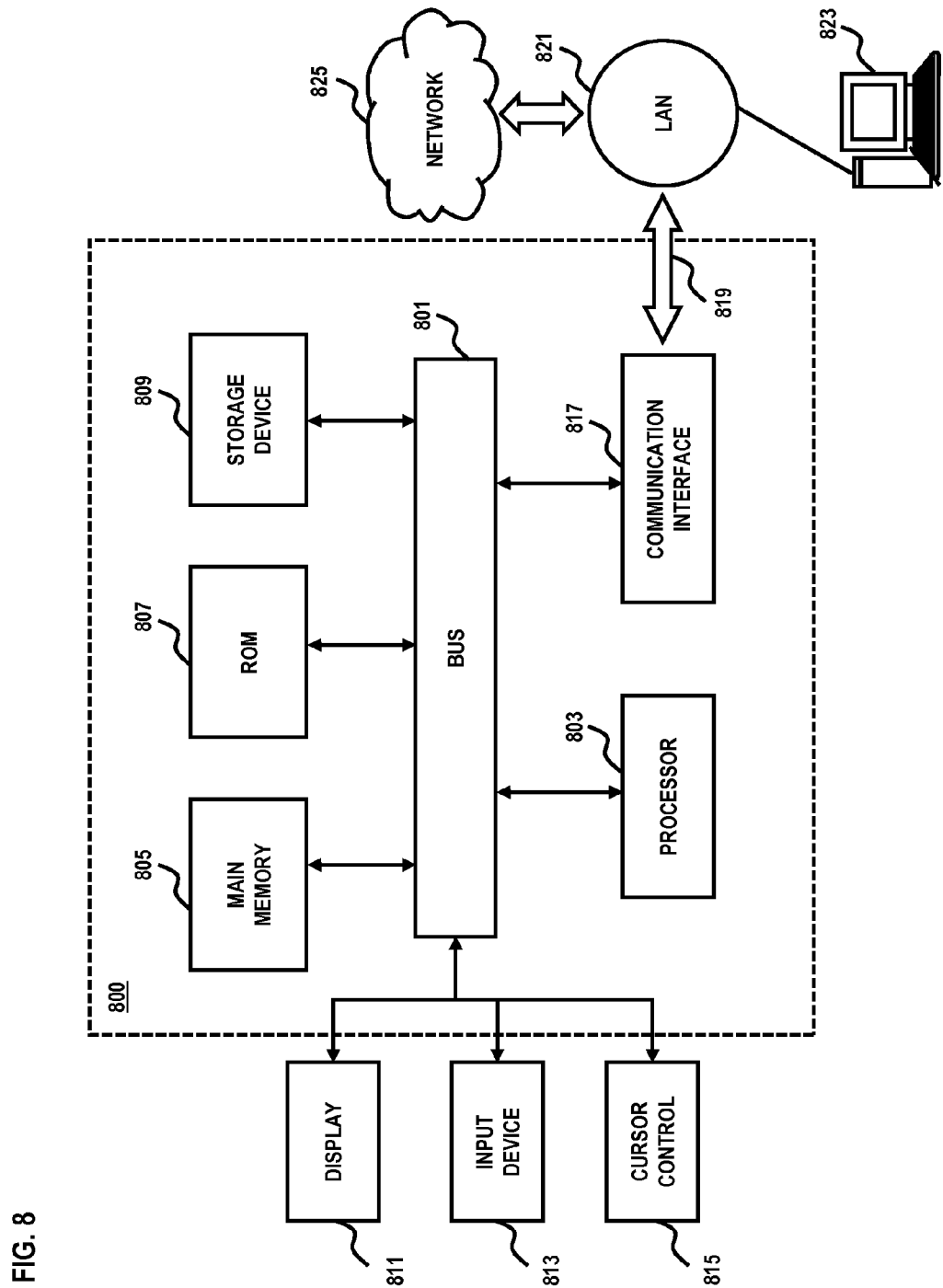
FIG. 8 is a diagram of a computer system that can be used to implement various exemplary embodiments.

FIG. 3 is a flowchart of a process for providing an index of media content for controlling playback availability of media content, according to one embodiment. By way of example, process 300 is explained with respect to system 100 of FIG. 1 and mark insertion system 103 of FIGS. 1 and 2. Also, process 300 may be implemented in, for instance, a chip set including a processor and a memory as shown in FIG. 8. According to certain embodiments, mark insertion system 103 executes process 300 to control playback availability of media content. Additionally, or alternatively STB 105 may execute process 300. In one embodiment, the STB 105 may execute process 300 without use of private indicators or marks. That is, a portion of a session may be determined by reference to a frame, time stamp, etc. For example, STB 105 indicates a frame, time stamp, etc., of a session in a log and determines one or more portions of a session by use of the indication in the log. In another embodiment, STB 105 stores portions of a session separately from the session. It is noted that the steps of process 300 may be performed in any suitable order, as well as combined or separated in any suitable manner. Although the mark insertion system 103 is described as inserting one or more marks to indicate a single portion of a session, it is contemplated that the mark insertion system 103 may be configured to insert marks (or private descriptors) to indicate a plurality of portions of a single session (and/or multiple sessions).

In step 301, process 300 initiates a recording of a video session associated with a media stream. In one embodiment, the video session is determined by first retrieving scheduling information associated with one or more electronic program guides (EPG) indicating one or more video sessions associated with the media stream including the video session, and a user selects the video session via STB 105. By way of example, traditional means may be used to initiate a recording, such as use of a scheduler to determine a start and end time of a session in response to an input indicating a session name.

Next, the process 300 selects, as in step 303, a portion of the video session. In one embodiment, the mark insertion system 103 determines, during the recording of the video session or during playback of the video session, a user input indicating one or more frames of the video session. For example, STB 105 may receive an input at a certain time (or frame) during a live broadcast of a video session being recorded. In another example, STB 105 receives an input at a certain frame (or time) during playback of a recorded video session. In one embodiment, the indication of frames may be performed by a selection of a key on a remote device associated with STB 105. That is, a selection of a '1' key at a time (or frame) causes the mark insertion system 103 to insert one or more marks indicating a portion of the session. Table 1 illustrates an exemplary key map that may be used to indicate frames.

TABLE 1

| Key | Previous time to mark |
|---|---|
| '*1' | 15 seconds |
| '*2' | 30 seconds |
| '*3' | 45 seconds |
| '*4' | 1 minute |
| '*5' | 2 minutes |
| '*6' | 4 minutes |
| '*7' | 8 minutes |
| '*8' | 10 minutes |

Additionally, or alternatively, the mark insertion system 103 (or STB 105) selects a portion based on a user input indicating a search parameter. A search parameter may indicate, for instance, a person (e.g., an actor, a celebrity, an athlete, etc), a type of audience a portion is appropriate (e.g., a general audience, a teen audience, a young adult audience, etc.), a type of mature content (e.g., violent content, foul language, etc.), and the like. In one embodiment, one or more users create and access a shared database for determining marks from a search parameter. For example, a user may indicate a portion of a movie contains mature content and using user profile repository 121 enable other users access to marks (or private descriptors) indicating portions of the movie suitable for a teen audience. In another embodiment, users subscribe to a database containing marks indicating portions of session. For example, a subscriber may indicate a famous person, and STB 105 may select portions (e.g., clips) of recorded sessions (e.g., news commentary, movie roles, interviews, etc.) by accessing a subscriber database containing marks associated with the famous person.

In step 305, the process 300 configures an index for playback of the selected portion and for playback of the video session. The selected portion is played back when the video session is unavailable for playback. For instance, STB 105 may prevent the removal of the portion indicated by a mark inserted by mark insertion system 103 when removing the video session from a repository, as discussed further with respect to FIG. 4. Additionally, or alternatively, STB 105 may prevent playback of the portion indicated by a mark inserted by mark insertion system 103 unless authentication information is received by STB 105, as discussed further with respect to FIG. 5.

Figure 9:
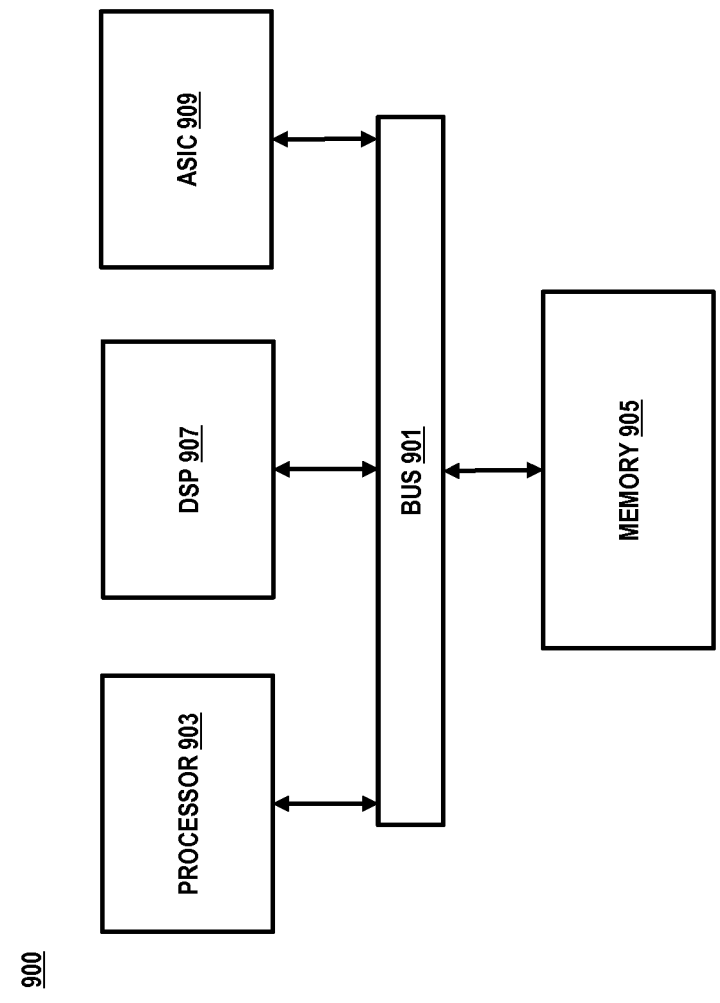
FIG. 9 is a diagram of a chip set that can be used to implement various exemplary embodiments.

FIG. 4 is a flowchart of a process utilizing an index of media content for removing media content from a repository, according to one embodiment. In one embodiment, the services of mark insertion system 103 are used to indicate a portion of a session. It is noted that the steps of process 400 may be performed in any suitable order, as well as combined or separated in any suitable manner. Also, process 400 may be implemented in, for instance, a chip set including a processor and a memory as shown in FIG. 9. For the purposes of explanation, process 400 is described with respect to the STB 105 of FIGS. 1 and 2.

In step 401, process 400 associates a first priority value to the video session and a second priority value to the selected portion, wherein the removal of the part of the video session is based on the first priority value, and the selected portion is available for playback after removing the part of the video session based on the second priority value. For example, memory management applications of the STB 105 may prioritize a retention of video sessions such that some video sessions (e.g., older video sessions, previously viewed video session, etc.) are removed before other video session (e.g., new older video sessions, unviewed video session, etc). Using such a memory management application, STB 105 may be configured to retain a portion (e.g., a tennis match) of a video session (e.g., a tennis tournament) even when a remaining part of the video session (e.g., other tennis matches) is removed, as in step 403. In this manner, users may playback a desired portion of a video session without retaining the entire video session on, for instance, a repository located on STB 105, content repository 113, and the like. Additionally, users may benefit from making a part of a video session content unavailable (but still stored in a repository), for example, if a particular service limits a total time of available recordings associated with a user, or charges a fee for maintaining access based on a total time of available recordings. Further, users may benefit from marking a portion of a video session for playback later, for example, in order to reduce a fee associated with playback of the video session.

FIG. 5 is a flowchart of a process utilizing an index of media content for controlling playback of selected portions, according to one embodiment. It is noted that the steps of process 500 may be performed in any suitable order, as well as combined or separated in any suitable manner. Also, process 500 may be implemented in, for instance, a chip set including a processor and a memory as shown in FIG. 9. For the purposes of explanation, process 500 is described with respect to the STB 105 of FIGS. 1 and 2, and the mark insertion system 103 of FIG. 2.

In step 501, process 500 configures the index for playback of a part of the video session that does not include the selected portion, wherein the part of the video session is played back when the selected portion is unavailable. That is, the services of mark insertion system 103 (and/or STB 105) may be configured to index a playback of a part of a video session (e.g., a TV show) that does not include the selected portion (e.g., a mature scene). Users may benefit from the index of the playback of a part of a video session, for example, if a service charges a fee for a playback of particular portions (e.g., scenes associated with an extended version of a movie, commentary, etc). It is contemplated that a user may be prompted to enable (e.g., authorize the fee) a playback of one or more portions of the video session during a playback or a recording of the part of video session. In another example, parental control applications of the STB 105 may restrict viewing of a video session without authentication information such as a code or parental password associated with user profile repository 121. Using such a parental control application, STB 105 may be configured to restrict a playback of a portion of a video session (e.g., a violent or mature scene of a movie), but allow a playback of a remaining part of the video session (e.g., movie without the violent or mature scene). In this manner, users of the index may playback a desired portion of a video session. As previously discussed, users may share, post in a log (e.g., user profile repository 121) marks associated with portions of a video session and STB 105 may be configured to select (e.g., step 303) a portion using the shared information.

Additionally, the process 500 (e.g., STB 105, mark insertion system 103, etc.) determines authentication information authorizing playback (e.g., parental password or code authorizing a charge for additional content) of the selected portion (step 503), and configures the index for playback of the video session (e.g., the movie with a mature scene or with additional content) based on the authentication information (step 505). In one embodiment, the authentication information is determined, for instance, via a user prompt associated with STB 105, when selecting playback of the video session. Alternatively, or additionally the authentication information may be determined when playback of the video session (e.g., a movie) reaches a portion (e.g., a violent or mature scene of a movie). In this manner, a user may insert authentication before initiating or during a playback of a part or portion of the video session. As previously noted, authentication information may be a parental password, authorization to charge an account associated with the STB 105, and the like.

Figure 6:
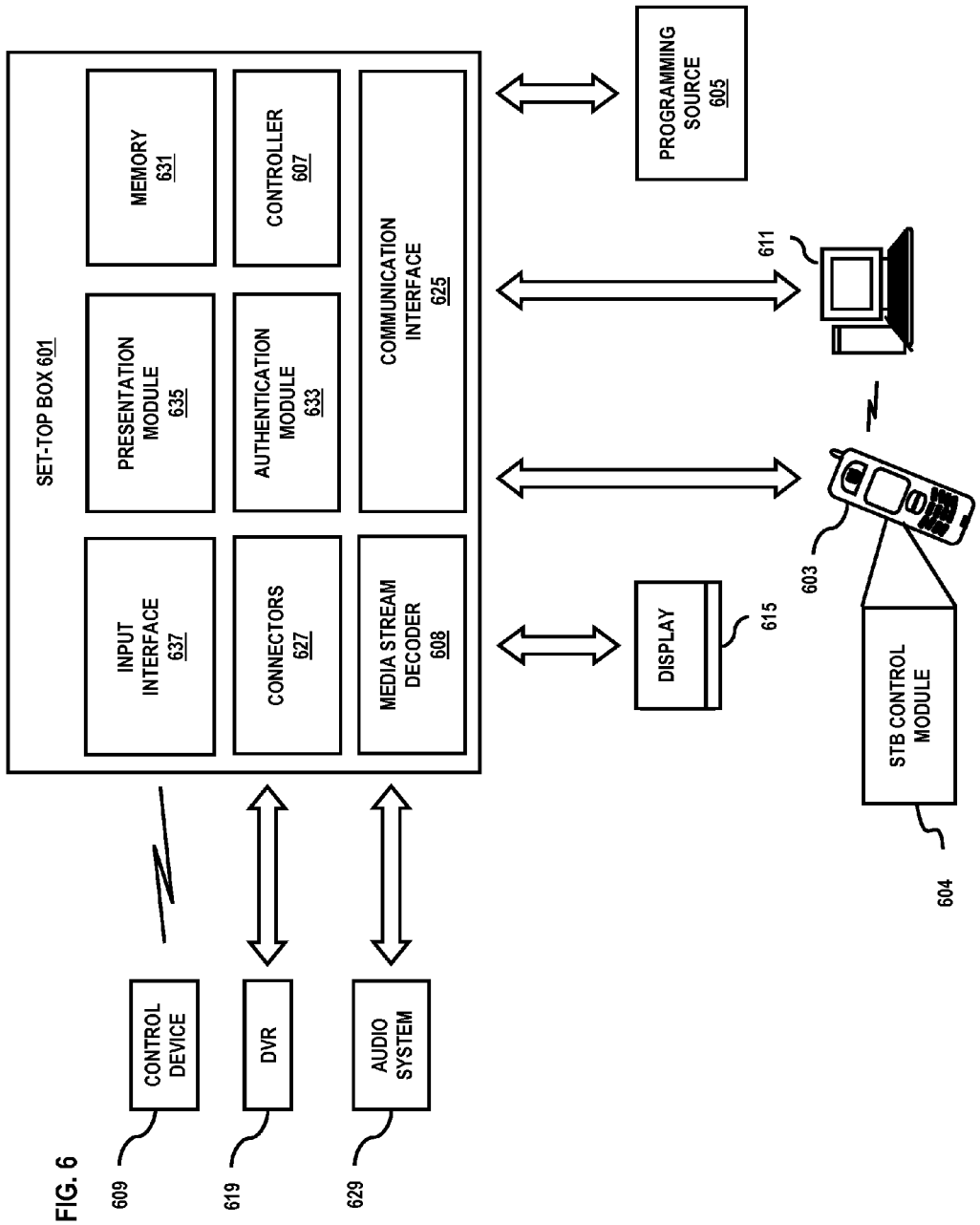
FIG. 6 is a diagram of a set-top box configured to be controlled based on sensor information from a user device, according to one embodiment.

FIG. 6 is a diagram of a set-top box configured to be controlled based on sensor information from a user device, according to an exemplary embodiment. STB 601 may utilize any suitable technology to receive media from user device 603 (e.g., mobile phone), as well as one or more media (or content) streams from a programming source 605, such as the IPTV system of FIG. 1. In this example, user device 603 includes an STB control module 604 to generate and forward sensor events to STB 601. STB control module 604 communicates with various sensors (e.g., a gyroscope, accelerometer, light sensor, proximity sensor, temperature sensor, pressure sensor, or magnetic sensor) of user device 603.

STB 601 may comprise computing hardware (such as described with respect to FIG. 8) and include additional components configured to provide services. In addition, STB 601 includes hardware and/or other components to support related functions and capabilities for viewing video assets (e.g., remote control capabilities, conditional access functions, tuning functions, presentation functions, multiple network interfaces, audio/video signal ports, etc.). As shown in FIG. 6, the functions and operations of STB 601 may be governed by a controller 607, which interacts with a media stream decoder 608. The decoder 608 can process media streams containing the marks of mark insertion system 103. Additionally, controller 607 interacts with each of the STB components to provide programming guide information (e.g., EPG) and related content retrieved from an audio or video-sharing site, as well as from another STB device or component of system 100. In turn, the user may be afforded greater functionality utilizing a control device 609 to control the personalized programming guide service and related services, as will be more fully described below.

STB 601 may be configured to communicate with a number of user devices, including: a PC 611, laptops, PDAs, cellular phones (e.g., device 603), mobile devices, handheld devices, as well as any other equivalent technology capable of capturing and storing media.

As such, STB 601 may be configured to provide an indicator that the STB 601 is being controlled by the mobile unit 603 on (or at) display 615. In one embodiment, presentation of the media (or content) may include: displaying, recording, playing, rewinding, forwarding, toggling, selecting, zooming, or any other processing technique that enables users to manipulate the media. For instance, STB 601 may provide one or more signals to the display 615 (e.g., television) so that the display 615 may present the media, as images, audio, video, or any combination thereof. A communication interface (not illustrated) of PC 611 may be configured to retrieve the programming and content information over the data network (e.g., packet-based network 109), wherein STB 601 may receive a programming content stream from PC 611 to present to the user via display 615.

STB 601 may also interact with a PVR, such as digital video recorder (DVR) 619, to store received content that can then be manipulated by a user at a later point in time. In various embodiments, DVR 619 may be network-based, e.g., included as a part of the service provider network 101, collocated at a subscriber site having connectivity to STB 601, and/or integrated into STB 601.

Furthermore, STB 601 may include a communication interface 625 configured to receive content streams from the programming service provider 115, PC 611, server (not shown), or other programming content source, such as media source 603. Communication interface 625 may optionally include single or multiple port interfaces. For example, STB 601 may establish a broadband connection to multiple sources transmitting content to STB 601 via a single port, whereas in alternative embodiments, multiple ports may be assigned to the one or more sources. In still other embodiments, communication interface 625 may be configured to permit users, via STB 601, to transmit data (including media content) to other users with STBs, a programming service provider 115, or other content source/sink.

According to various embodiments, STB 601 may also include inputs/outputs (e.g., connectors 627) to display 615 and DVR 619, as well as an audio system 629. In particular, audio system 629 may comprise a conventional audio-video receiver capable of monaural or stereo sound, as well as multichannel surround sound. Audio system 629 may include speakers, ear buds, headphones, or any other suitable component configured for personal or public dissemination. As such, STB 601, display 615, DVR 619, and audio system 629, for example, may support high resolution audio and/or video streams, such as high definition television (HDTV) or digital theater systems high definition (DTS-HD) audio. Thus, STB 601 may be configured to encapsulate data into a proper format with required credentials before transmitting onto one or more of the networks of FIG. 1 and de-encapsulate incoming traffic to dispatch data to display 615 and/or audio system 629.

In an exemplary embodiment, display 615 and/or audio system 629 may be configured with internet protocol (IP) capability (i.e., includes an IP stack, or is otherwise network addressable), such that the functions of STB 601 may be assumed by display 615 and/or audio system 629. In this manner, an IP ready, HDTV display or DTS-HD audio system may be directly connected to one or more service provider networks 101, packet-based networks 109, and/or telephony networks 111. Although STB 601, display 615, DVR 619, and audio system 629 are shown separately, it is contemplated that these components may be integrated into a single component, or other combination of components.

Authentication module 633 with STB 601 may also be responsible for detecting and authenticating one or more user devices 603. Additionally, authentication module 633 may be provided to initiate or respond to authentication schemes of, for instance, service provider network 101 or various other content providers, e.g., broadcast television systems 123, third-party content provider systems 125, or servers 119. Authentication module 633 may provide sufficient authentication information, e.g., a user name and password, a key access number, a unique machine identifier (e.g., MAC address), and the like, as well as combinations thereof, to a corresponding network interface for establishing connectivity. As described earlier, one or more digital certificates may be simultaneously mapped. Moreover, authentication at STB 601 may identify and authenticate a second device (e.g., PC 611) communicatively coupled to, or associated with, STB 601, or vice versa. Further, authentication information may be stored locally at memory 631, in a repository (not shown) connected to STB 601, or at a remote repository, e.g., user profile repository 121.

Authentication module 633 may also facilitate the reception of data from single or disparate sources. For instance, STB 601 may receive broadcast video from a first source (e.g., program service provider 115), signals from a second source (e.g., server 119), and a programming content stream from a third source accessible over a data network (e.g., content repository 113). As such, display 615 may present the broadcast video and programming content stream to the user. This presentation may be experienced separately, concurrently, in a toggled fashion, or with zooming, maximizing, minimizing, or trick capabilities, or equivalent mode.

Connector(s) 627 may provide various physical interfaces to display 615, audio system 629, as well as other peripherals; the physical interfaces may include, for example, RJ45, RJ11, high definition multimedia interface (HDMI), optical, coax, FireWire®, wireless, and universal serial bus (USB), or any other suitable connector. The presentation module 635 may also interact with a control device 609 for determining particular media content that a user desires to experience. In an exemplary embodiment, the control device 609 may comprise a remote control (or other access device having control capability, such as a PC 611, wireless device, mobile phone, etc.) that provides a user with the ability to readily manipulate and dynamically change parameters affecting the device event-based STB control service. In other examples, STB 601 may be configured for voice recognition such that STB 601 may be controlled with spoken utterances.

In addition to the user device 603 being configured to control the manner in which STB 601 behaves in response to device events, STB 601 may also permit control device 609 to activate and deactivate the device event-based STB control service. In this manner, control device 609 may include (not shown) a cursor controller, trackball, touch screen, touch pad, keyboard, and/or a key pad for activating a slideshow application, selecting programming content, as well as performing other control functions. Control device 609 may also include functional actuators (e.g., buttons, keys, icons, etc.), such as power on/of, play, pause, stop, fast-forward, reverse, volume up/down, channel up/down, menu, ok/enter, record, info, my content, search, edit, or exit, as well as any other suitable control trigger, such as alphanumeric buttons, shift, control, back, symbols, and the like.

Further, the control device 609 may comprise a memory (not illustrated) for storing preferences relating the device event-based STB control service; such preferences can be conveyed to STB 601 through an input interface 637. The input interface 637 may support any type of wired and/or wireless link, e.g., infrared, radio frequency (RF), BLUETOOTH™, and the like. Thus, control device 609 may store user preferences with respect to the parameters associated with the device event-based STB control service. Alternatively, user preferences may be tracked, recorded, or stored in STB 601 or in a network user profile repository 121. The preferences may be automatically retrieved and activated by a user at any time. It is noted that the control device 609 may be separate from STB 601 or may be integrated within STB 601 (in which case certain input interface hardware and/or software may not be necessary).

The described processes and arrangement, in some embodiments, advantageously enable an efficient and flexible approach to indexing media content for controlling availability and/or playback of a vast variety of media content without requiring hardware upgrade or replacement.

Figure 7:
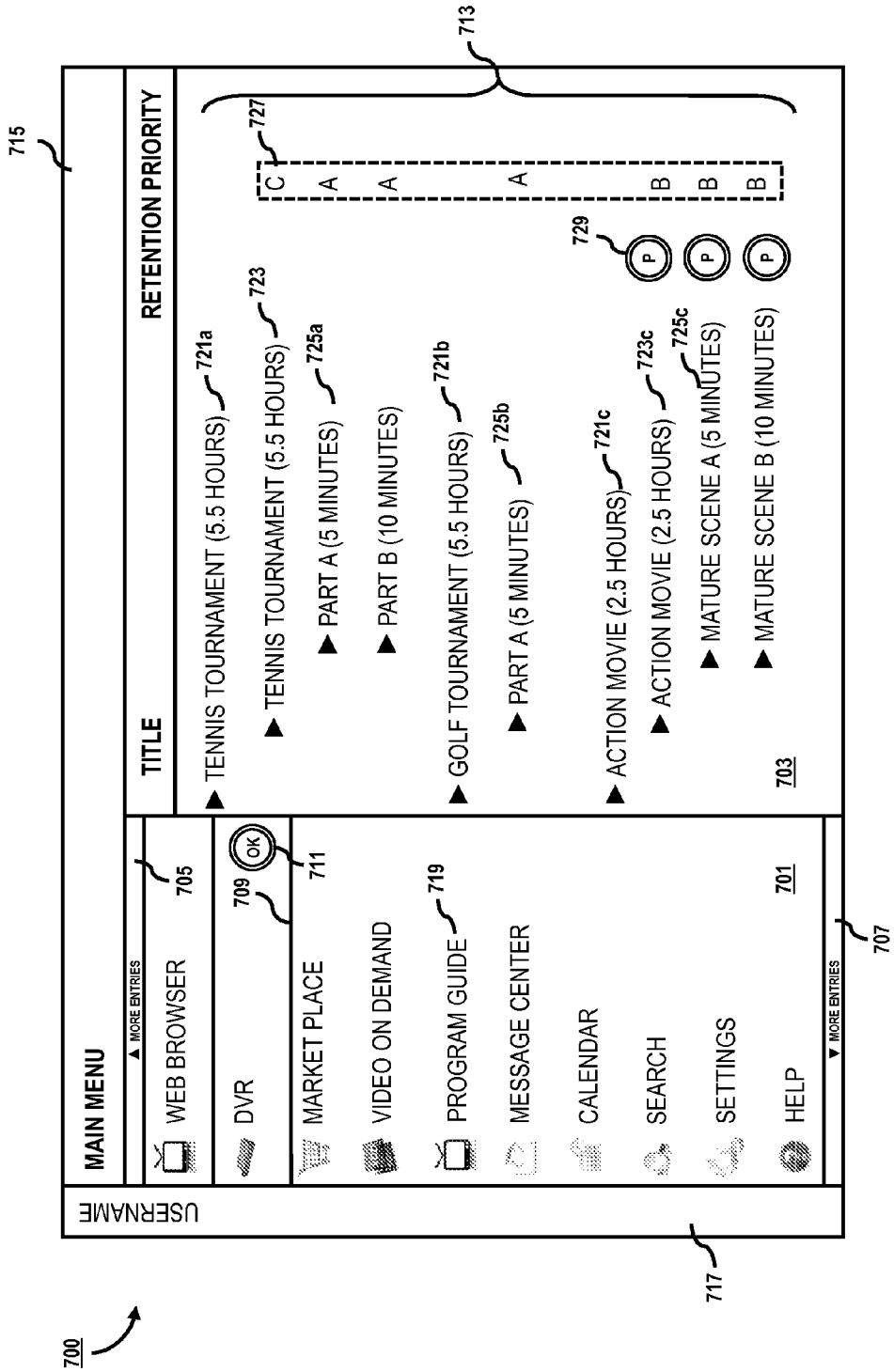
FIG. 7 is a diagram of a graphical user interface (GUI) presented via a set-top box for providing an index of media content for controlling playback availability of media content, according to one embodiment.

FIG. 7 is a diagram of a graphical user interface (GUI) presented via a set-top box for providing various options for managing DVR operations, according to one embodiment. GUI (or main menu) 700 may be evoked using a number of different methods. For example, a user may select a dedicated "MENU" button on control device 609 or a peripheral device communicatively coupled thereto, such as computing device 107, a mobile handset (not shown), and the like. It is recognized that any other suitable actuator of these devices may be additionally, or alternatively, used to access the functionality of main menu 700, such as triggering a "GUIDE" icon. Further, main menu 700 may be evoked by selecting an option within another interface or application, such as, for example, when navigating from a public screen (or navigational shell) to a user-specific screen, i.e., a private screen. As such, an executing device (e.g., device 600, computing device 107, etc.) may require sufficient authentication information (e.g., username and password, etc.) to be input in order to access the functions of main menu 700.

As seen in FIG. 7, GUI 700, providing a "main menu," may include one or more interactive viewing panes, such as panes 701 and 703. In particular embodiments, as will be described in more detail below, the content of pane 703 may be dynamically updated to display various menu options, interaction elements, information, etc., related to user interaction within pane 701, and vice versa. In this example, however, pane 701 includes a listing of selectable entries corresponding to one or more features (or options) that may be provided via content processing device 700. For example, entries may include: program guide options, DVR options, marketplace (or shopping) options, on-demand programming options, media manager options, messaging and communications options, searching options, setting options, help options, and the like. In certain embodiments, graphical elements may be provided to correspond to one or more of these entries and, as a result, may be correspondingly displayed therewith.

One or more header 705 and footer 707 fields may be provided and configured to indicate the existence of additional entries not displayed, but navigably available. Accordingly, users may browse through the entries of user interface 700 via, for instance, control device 609 associated with device 700. Further, GUI 700 may include one or more fixed focus states (such as border 709) and/or distinctive magnification features, e.g., color, brightness, bolding, font type, text size, etc., that may be used to convey a "currently" navigated position. In this manner, when a user navigates to a desired entry, actuation of, for instance, an "OK" button on control device 609 may launch (or evoke) corresponding features and/or applications associated with the particular entry. According to some embodiments, an interactive "OK" option 711 may be utilized.

Moreover, main menu 700 may include one or more additional user options 713, when a user navigates to a particular entry. As shown in user options 713, the options allow users to select listings of media content, such a recorded sporting event, movie, TV show, and the like. These options correspond to certain of the functions of device 600, as described in FIG. 6. In other (or additional) embodiments, one or more aural descriptions of an entry "currently" navigated to and methods of interaction may be provided.

In certain other exemplary embodiments, main menu 700 may provide one or more navigation fields 715 and 717 to facilitate usability. For example, field 715 may provide the name of the function/option being accessed, e.g., "MAIN MENU." In this manner, when a user accesses a new function/option, field 715 may be automatically (or dynamically) updated. Field 717 may be utilized to indicate a user profile "currently" authenticated to system 100, e.g., "USERNAME." Thus, a user may access one or more features and/or functions associated with the DVR and/or device 600 by navigating to and selecting (or otherwise interacting with) entry 719 of main menu 700.

As shown in the exemplary embodiment, the GUI 700 displays a title 721 that when selected causes GUI 700 to display of a subtitle 723 (if available) and one or more portion titles 725 (if available). Additionally, the subtitle 723 and each of the one or more portion titles 725 may have a retention priority level 727 used to, for instance, prioritize retention as described in FIG. 4. The GUI 700 also displays an indicator 729 suggesting a parental control restricting playback of a corresponding subtitle 723 (e.g., 723*c*), or portion title (e.g., 725*c*). As such, a user actuation of, for instance, a "Parental control" button on control device 609 may launch (or evoke) corresponding features and/or applications associated with authenticating access to an associated subtitle 723 (e.g., 723*c*), or portion title (e.g., 725*c*).

The processes described herein for providing an index of media content for controlling playback availability of media content may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 8 is a diagram of a computer system that can be used to implement various exemplary embodiments. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to certain embodiments, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 is a diagram of a chip set that can be used to implement various exemplary embodiments. Chip set 900 is programmed to provide an index of media content for controlling playback availability of media content as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 3-5.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    initiating a recording of a video session associated with a media stream;
    determining a frame of the video session displayed during a user input indicating a duration;
    selecting a portion of the video session having the frame as a last frame and the duration as a playback time, wherein the portion is selected by dynamic insertion of one or more frame markers into the media stream during the video session; and
    configuring an index for playback of the selected portion and for playback of the video session, wherein the selected portion is played back when the video session is unavailable for playback.

2. The method of claim 1, further comprising:
    retrieving scheduling information associated with one or more electronic program guides indicating a plurality of video sessions associated with the media stream including the video session, wherein the video session recording is initiated based on the scheduling information.

3. The method of claim 1, further comprising removing a part of the video session from a repository that does not include the selected portion, wherein the removal of the part of the video session renders the video session unavailable for playback, and the selected portion is played back after removing the part of the video session.

4. The method of claim 3, further comprising:
    designating a first priority value to the video session, wherein the removal of the part of the video session is based on the first priority value; and
    designating a second priority value to the selected portion, wherein the selected portion is available for playback after removing the part of the video session based on the second priority value.

5. The method of claim 1, further comprising configuring the index for playback of a part of the video session that does not include the selected portion, wherein the part of the video session is played back when the selected portion is unavailable.

6. The method of claim 5, further comprising:
    determining authentication information authorizing playback of the selected portion when the playback of the video session reaches the selected portion; and
    configuring the index for playback of the video session based on the authentication information.

7. The method of claim 1, further comprising:
    selecting another portion of the video session; and
    configuring the index for playback of the another selected portion, wherein the another selected portion is played back when the video session is unavailable for playback.

8. An apparatus comprising:
    at least one processor; and
    at least one memory including computer program code,
    the at least one memory and the computer program code configured to, with the at least one processor, cause the apparatus to perform at least the following,
        initiate a recording of a video session associated with a media stream;
        determine a frame of the video session displayed during a user input indicating a duration;
        select a portion of the video session having the frame as a last frame and the duration as a playback time, wherein the portion is selected by dynamic insertion of one or more frame markers into the media stream during the video session; and
        configure an index for playback of the selected portion and for playback of the video session, wherein the selected portion is played back when the video session is unavailable for playback.

9. The apparatus according to claim 8, wherein the apparatus is further caused to:
    retrieve scheduling information associated with one or more electronic program guides indicating a plurality of video sessions associated with the media stream including the video session, wherein the video session recording is initiated based on the scheduling information.

10. The apparatus according to claim 8, wherein the apparatus is further caused to remove a part of the video session from a repository that does not include the selected portion, wherein the removal of the part of the video session renders the video session unavailable for playback, and the selected portion is played back after removing the part of the video session.

11. The apparatus according to claim 10, wherein the apparatus is further caused to:
    designate a first priority value to the video session, wherein the removal of the part of the video session is based on the first priority value; and designate a second priority value to the selected portion, wherein the selected portion is available for playback after removing the part of the video session based on the second priority value.

12. The apparatus according to claim 8, wherein the apparatus is further caused to configure the index for playback of a part of the video session that does not include the selected portion, wherein the part of the video session is played back when the selected portion is unavailable.

13. The apparatus according to claim 12, wherein the apparatus is further caused to:
   determine authentication information authorizing playback of the selected portion when the playback of the video session reaches the selected portion; and
   configure the index for playback of the video session based on the authentication information.

14. The apparatus according to claim 8, wherein the apparatus is further caused to:
   select another portion of the video session; and
   configure the index for playback of the another selected portion, wherein the another selected portion is played back when the video session is unavailable for playback.

15. A method comprising:
   initiating, by a set-top box, a recording of a video session associated with a media stream;
   determining, by the set-top box, a frame of the video session displayed during a user input indicating a duration;
   selecting, by the set-top box, a portion of the video session having the frame as a last frame and the duration as a playback time, wherein the portion is selected by dynamic insertion of one or more frame markers into the media stream during the video session; and
   configuring, by the set-top box, an index for playback of the video session and for playback of the selected portion, wherein the selected portion is played back when the video session is unavailable for playback.

16. The method according to claim 15, further comprising:
   retrieving, by the set-top box, scheduling information associated with one or more electronic program guides indicating a plurality of video sessions associated with media stream including the video session, wherein the video session recording is initiated based on the scheduling information.

17. The method according to claim 15, further comprising removing a part of the video session from memory of the set-top box that does not include the selected portion, wherein the removal of the part of the video session renders the video session unavailable for playback, and the selected portion is played back after removing the part of the video session.

18. A set-top box device comprising:
   a processor configured to:
      initiate a recording of a video session associated with a media stream,
      determine a frame of the video session displayed during a user input indicating a duration,
      select a portion of the video session having the frame as a last frame and the duration as a playback time, wherein the portion is selected by dynamic insertion of one or more frame markers into the media stream during the video session, and
      configure an index for playback of the video session and for playback of the selected portion; and
   a memory configured to store the video session,
   wherein the selected portion is played back when the video session is unavailable for playback.

19. The set-top box device according to claim 18, wherein the processor is further configured to:
   retrieve scheduling information associated with one or more electronic program guides indicating a plurality of video sessions associated with media stream including the video session, wherein the video session recording is initiated based on the scheduling information.

20. The set-top box device according to claim 18, wherein the processor is further configured to remove a part of the video session from the memory that does not include the selected portion, wherein the removal of the part of the video session renders the video session unavailable for playback, and the selected portion is played back after removing the part of the video session.

* * * * *